Figure 3:
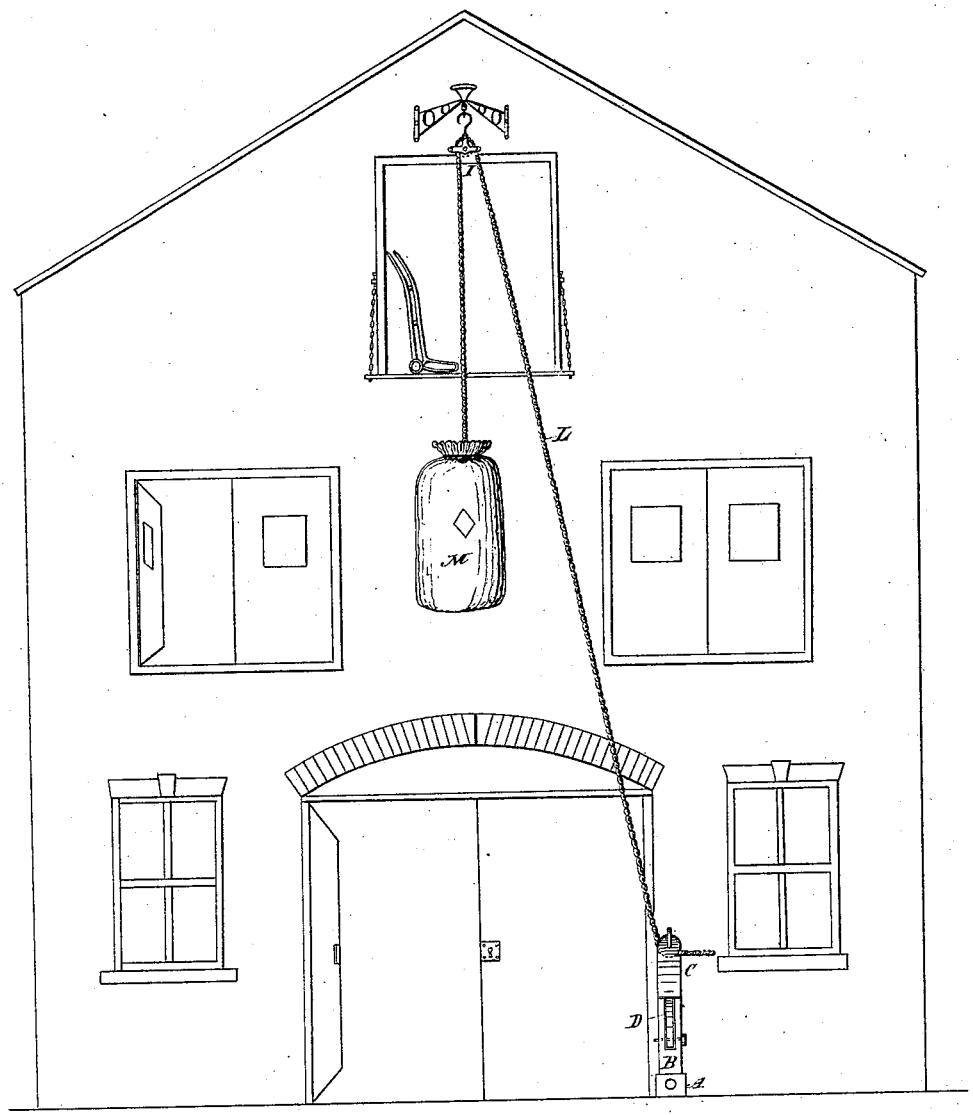

(No Model.)
2 Sheets—Sheet 1.
J. W. PORRITT.
HOISTING AND LOWERING GEAR.
No. 307,986. Patented Nov. 11, 1884.
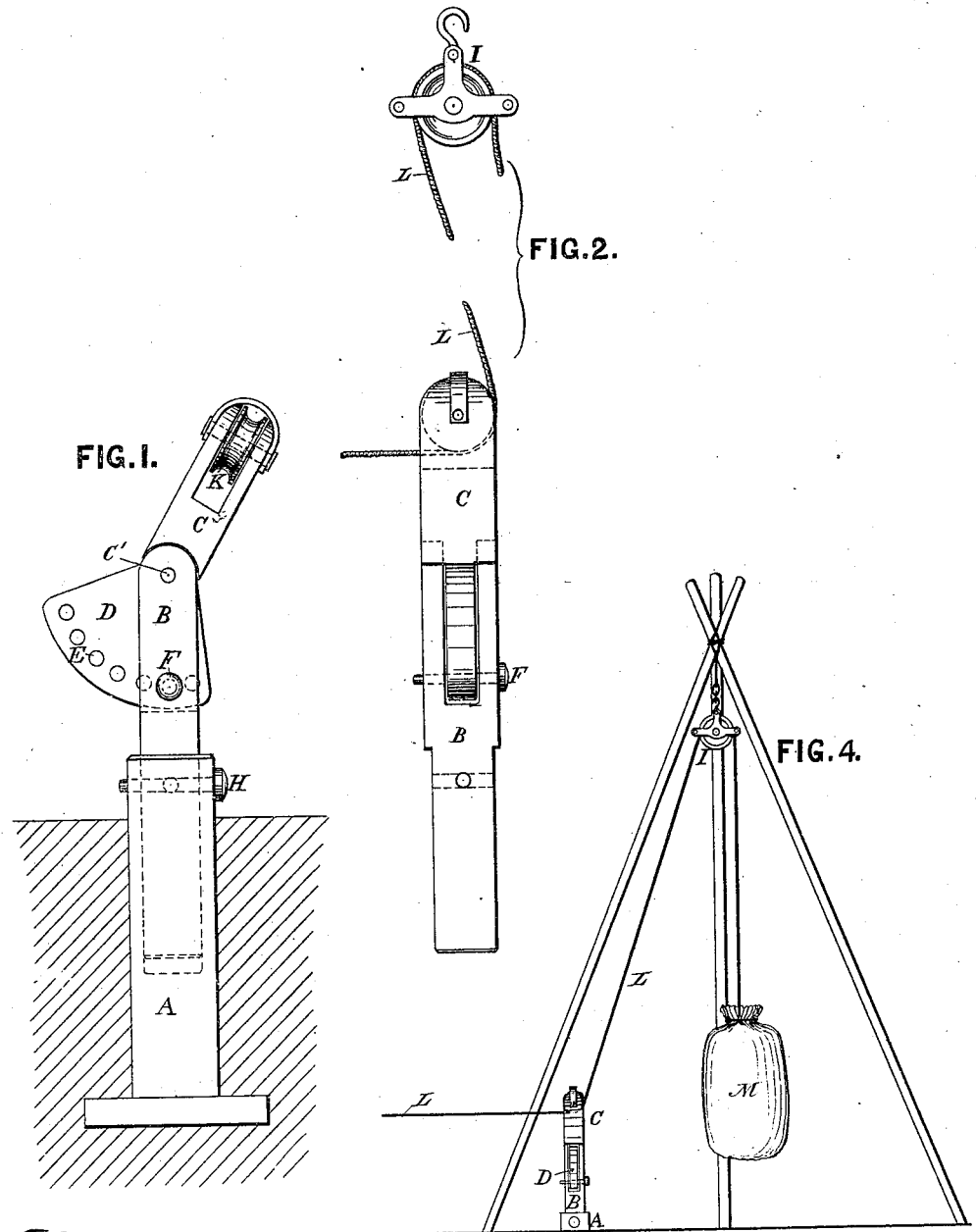

(No Model.)

2 Sheets—Sheet 2.

J. W. PORRITT.
HOISTING AND LOWERING GEAR.

No. 307,986.

Patented Nov. 11, 1884.

UNITED STATES PATENT OFFICE.

JAMES WILLIAM PORRITT, OF CLEY, ENGLAND.

HOISTING AND LOWERING GEAR.

SPECIFICATION forming part of Letters Patent No. 307,986, dated November 11, 1884.

Application filed August 5, 1884. (No model.)

*To all whom it may concern:*

Be it known that I, JAMES WILLIAM PORRITT, a subject of the Queen of England, residing at Cley, England, have invented a new and useful Hoisting and Lowering Gear, of which the following is a specification.

This invention relates to a handy apparatus for use on farms and in many other places where a load may be raised by animal or other power applied at one end of a rope or equivalent, the load being at the other end.

In the accompanying drawings, Figure 1 is a front view of the chief portion of the apparatus, and Fig. 2 a side view of the same. Fig. 3 shows it applied to a warehouse, and Fig. 4 shows how it may be utilized in an open space—as a field—by the use of shear-legs.

A is a trunk or socket, which may be sunk in the ground, either as a permanency, a trunk being placed in such positions as are most frequently required, or the trunk can be carried about with the rest of the apparatus and sunk in the ground when and where required for use. Where the surroundings are suitable, the trunk may be fastened in any suitable manner without sinking it in the ground.

B is the jaw carrying the movable head C, pivoted at C', which has the fan-tail D, perforated with holes E, through which and the jaw passes the pin F, which thus secures the head C in the position required; or the pin and holes may be dispensed with and a set-screw or equivalent substituted. The jaw B fits into the trunk A, as shown, and may be fixed by a pin, H, or equivalent device. The tail of the jaw and the hole of the trunk are shown square in the drawings; but any other suitable form of cross-section may be adopted, the square being convenient and in practice found to answer well. The head C can thus be turned to face in any required direction in the trunk to suit the line which must be taken by the horse or other animal in pulling the rope, while it can also be canted over to suit the position of the top pulley, I, Figs. 3 and 4, so that a fair pull may be obtained. The head C carries at its upper end the pulley K, round which the rope L is passed, and in any suitable position above the load is the pulley I, by preference hung so as to be free to turn in any direction, as shown in Fig. 2.

The apparatus is used as follows: The load M, Fig. 3, is attached to the rope L, which passes round the top pulley, I, and down to the second pulley, K, round which it passes, and its other end is fastened to the horse or other source of power. As the rope is pulled the load is run up, and may then be deposited where required. It will be seen that this apparatus can be arranged so that the horse can travel in whatever direction may be most convenient, so that if one direction will not suit it can be turned to another which does.

The application shown in Fig. 4 is adapted for open fields or similar places where there is no building to carry the pulley I, and the shear-legs are therefore substituted.

This arrangement is useful for loading sacks of grain which have been thrashed in the open field into carts, and for similar purposes.

I claim—

1. In hoisting devices, the jaw B, carrying the movable head C, in combination with the trunk A, adapted to be sunk in the ground, and a pin for securing the jaw in the head, substantially as described.

2. In hoisting devices, the combination, with the jaw B, having a pin, F, of the movable head C, pivoted at C', and formed with the fan-tail D, provided with perforations, through which the said pin F is passed to hold it in the desired position, substantially as described.

3. In hoisting devices, the combination, with the portable trunk A, adapted to be sunk in the ground, the jaw B, located therein, and adapted to be turned in any direction and secured, and the movable head, pivoted in said jaw and adjustable therein to varying inclinations, of the adjustable swivel or pulley I and a tripod or shear-legs, all substantially as shown and described.

In testimony whereof I have hereto set my hand in the presence of two subscribing witnesses.

JAMES WILLIAM PORRITT.

Witnesses:
   H. BRIDGE,
   JNO. DEAN.